United States Patent
Boche et al.

(10) Patent No.: US 12,448,113 B2
(45) Date of Patent: Oct. 21, 2025

(54) PROTECTION SYSTEM

(71) Applicant: RATIER-FIGEAC SAS, Figeac (FR)

(72) Inventors: Adele Boche, Albiac (FR); Romain Bouloc, Saint Felix (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 18/655,490

(22) Filed: May 6, 2024

(65) Prior Publication Data
US 2024/0367776 A1 Nov. 7, 2024

(30) Foreign Application Priority Data

May 4, 2023 (EP) .................................... 23315156

(51) Int. Cl.
*B64C 11/30* (2006.01)
(52) U.S. Cl.
CPC .................................. *B64C 11/305* (2013.01)
(58) Field of Classification Search
CPC ........ B64C 11/305; B64C 11/30; B64C 11/00
USPC ......................................................... 416/27
See application file for complete search history.

(56) References Cited

U.S. PATENT DOCUMENTS

| 5,019,006 | A | 5/1991 | Schneider et al. |
| 10,822,105 | B2 * | 11/2020 | Yakobov ................. F02C 6/206 |
| 11,313,286 | B2 | 4/2022 | Chahal et al. |
| 2019/0031319 | A1 | 1/2019 | Calkins et al. |
| 2020/0010207 | A1 | 1/2020 | Yakobov et al. |
| 2020/0283124 | A1 | 9/2020 | Zakucia et al. |
| 2022/0243600 | A1 | 8/2022 | Krzywon |

OTHER PUBLICATIONS

European Search Report for Application No. 23315156.2, mailed Oct. 5, 2023, 5 pages.

* cited by examiner

*Primary Examiner* — Michael L Sehn
(74) *Attorney, Agent, or Firm* — CANTOR COLBURN LLP

(57) ABSTRACT

A method of operating a propeller system for an aircraft. The method includes: receiving propeller speed information, the propeller speed information indicating propeller speed; receiving a target propeller speed; performing a propeller speed threshold adjustment process, the propeller speed threshold adjustment process comprising adjusting a propeller speed threshold as a function of the target propeller speed; comparing the propeller speed to the propeller speed threshold; and in response to propeller speed exceeding the propeller speed threshold, performing an overspeed protection process.

15 Claims, 3 Drawing Sheets

PROTECTION SYSTEM

CROSS REFERENCE TO RELATED APPLICATIONS

This application claims priority to European Patent Application No. 23315156.2 filed May 4, 2023, the entire contents of which is incorporated herein by reference.

FIELD OF THE INVENTION

This application relates to protection systems, propeller systems, aircraft and methods.

BACKGROUND

To reduce the likelihood of control hazard failures, protection processes against propeller overspeed are implemented in aircraft. The protection processes can be hydromechanically triggered and operated, often reducing blade angle to control propeller pitch in response to overspeed, which can lead to in-flight thrust dissymmetry between a healthy propeller and a failed propeller.

SUMMARY

In a first aspect, there is provided a method of operating a propeller system for an aircraft, the propeller system comprising a propeller, the method comprising: receiving propeller speed information, the propeller speed information indicating propeller speed; receiving a target propeller speed; performing a propeller speed threshold adjustment process, the propeller speed threshold adjustment process comprising adjusting a propeller speed threshold as a function of the target propeller speed; comparing the propeller speed to the propeller speed threshold; and in response to propeller speed exceeding the propeller speed threshold, performing an overspeed protection process.

By adjusting the propeller speed threshold in response to the target propeller speed, overspeed may be more rapidly detected regardless of flight phase. Additionally, detecting overspeed in this way may permit the propeller system to be controlled to reduce propeller speed during the overspeed protection process, which may avoid the need to vary blade angle to control propeller pitch, reducing dissymmetry between a healthy propeller and a failed propeller on an aircraft.

The method may comprise measuring a propeller speed parameter to provide the propeller speed information.

The propeller speed parameter may comprise propeller speed.

The propeller speed parameter may comprise a drive unit parameter measured from a drive unit of the aircraft, the drive unit configured to drive the propeller. The drive unit may comprise an engine. The drive unit may comprise a motor.

The overspeed protection process may comprises controlling the propeller system to reduce the propeller speed.

The overspeed protection process may comprise substantially maintaining blade angle at a target blade angle of the propeller.

The overspeed protection processes may exclude controlling the propeller system to vary a blade angle of the propeller.

Controlling the propeller system to reduce the propeller speed may comprise controlling the propeller system to reduce a propeller torque.

The overspeed protection process may comprise bypassing a propeller speed controller of the propeller system.

The list of presented protection processes is not exhaustive and may include any propeller control action aimed at avoiding propeller or aircraft component overload related to propeller overspeed.

The propeller speed threshold adjustment process may comprise reducing the propeller speed threshold in response to reducing target propeller speed.

The propeller speed threshold adjustment process may comprise adjusting the propeller speed threshold in proportion to the target propeller speed.

The propeller speed threshold adjustment process may comprise adjusting the propeller speed threshold to a constant value multiplied by the target propeller speed, wherein the constant value is greater than 1.

The propeller speed threshold adjustment process may comprise adjusting the propeller speed threshold to a constant value multiplied by the target propeller speed, wherein the constant value is less than 1.5.

The propeller speed threshold adjustment process may comprise adjusting the propeller speed threshold to a constant value multiplied by the target propeller speed, wherein the constant value is less than 1.4.

The propeller speed threshold adjustment process may comprise adjusting the propeller speed threshold to a constant value multiplied by the target propeller speed, wherein the constant value is less than 1.3.

The propeller speed threshold adjustment process may comprise adjusting the propeller speed threshold to a constant value multiplied by the target propeller speed, wherein the constant value is less than 1.2.

The propeller speed threshold adjustment process may comprise adjusting the propeller speed threshold to a constant value multiplied by the target propeller speed, wherein the constant value is less than 1.1.

According to a second aspect there is provided a protection system for a propeller system, the propeller system comprising a propeller, the protection system comprising a protection controller configured to: receive propeller speed information, the propeller speed information indicating propeller speed; receive a target propeller speed; perform a propeller speed threshold adjustment process, the propeller speed threshold adjustment process comprising adjusting a propeller speed threshold as a function of the target propeller speed; compare the propeller speed to the propeller speed threshold; and in response to propeller speed exceeding the propeller speed threshold, perform an overspeed protection process.

The protection controller may be a dedicated controller, or may be any existing controller of the aircraft in which the protection function software is implemented.

The protection system may comprise a propeller speed sensor configured to measuring a propeller speed parameter to provide the propeller speed information.

The propeller speed parameter may comprise propeller speed.

The propeller speed parameter may comprise a drive unit parameter measured from a drive unit of the aircraft, the drive unit configured to drive the propeller. The drive unit may comprise an engine. The drive unit may comprise a motor.

The overspeed protection process may comprises controlling the propeller system to reduce the propeller speed.

The overspeed protection process may comprise substantially maintaining blade angle at a target blade angle of the propeller.

The overspeed protection processes may exclude controlling the propeller system to vary a blade angle of the propeller.

Controlling the propeller system to reduce the propeller speed may comprise controlling the propeller system to reduce a propeller torque.

The overspeed protection process may comprise bypassing a propeller speed controller of the propeller system.

The propeller speed threshold adjustment process may comprise reducing the propeller speed threshold in response to reducing target propeller speed.

The propeller speed threshold adjustment process may comprise adjusting the propeller speed threshold in proportion to the target propeller speed.

The propeller speed threshold adjustment process comprises adjusting the propeller speed threshold to a constant value multiplied by the target propeller speed, wherein the constant value is greater than 1.

The propeller speed threshold adjustment process may comprise adjusting the propeller speed threshold to a constant value multiplied by the target propeller speed, wherein the constant value is less than 1.5.

The propeller speed threshold adjustment process may comprise adjusting the propeller speed threshold to a constant value multiplied by the target propeller speed, wherein the constant value is less than 1.4.

The propeller speed threshold adjustment process may comprise adjusting the propeller speed threshold to a constant value multiplied by the target propeller speed, wherein the constant value is less than 1.3.

The propeller speed threshold adjustment process may comprise adjusting the propeller speed threshold to a constant value multiplied by the target propeller speed, wherein the constant value is less than 1.2.

The propeller speed threshold adjustment process may comprise adjusting the propeller speed threshold to a constant value multiplied by the target propeller speed, wherein the constant value is less than 1.1.

The propeller speed threshold may be determined as a function of the target propeller speed, as alternatives, through a lookup table, through a calculation using other mathematic functions than proportionality, or combination of mathematic function, though a model embedded in the aircraft system, as non-exhaustive examples, with at least target propeller speed and propeller speed information as input data, and propeller speed threshold as output data. Other input data may be used in addition to target propeller speed and propeller speed information in order to determine propeller speed threshold.

According to a third aspect there is provided a propeller system comprising the protection system according to the second aspect and the propeller.

The propeller system may comprise a propeller speed controller, the propeller speed controller configured to control the propeller speed to the target propeller speed in the event that the propeller speed does not exceed the propeller speed threshold.

The propeller system may comprise a drive unit configured to drive the propeller. The drive unit may comprise an engine. The drive unit may comprise a motor.

According to a fourth aspect there is provide an aircraft comprising the propeller system according to the third aspect.

The method of the first aspect may comprise any of the features and/or functional steps described with respect to second, third and/or fourth aspects. The protection system of the second aspect may comprise any of the features and/or functional steps described with respect to the first, third and/or fourth aspects, and the protection controller may be configured to perform any of the method steps described with respect to the first aspect. The propeller system of the third aspect may comprise any of the features and/or functional steps described with respect to the first, second and/or fourth aspects. The aircraft of the fourth aspect may comprise any of the features and/or functional steps described with respect to the first, second and/or third aspects.

BRIEF DESCRIPTION OF THE DRAWINGS

Various examples will now be described with reference to the accompanying drawings in which.

DETAILED DESCRIPTION

Figure 1:
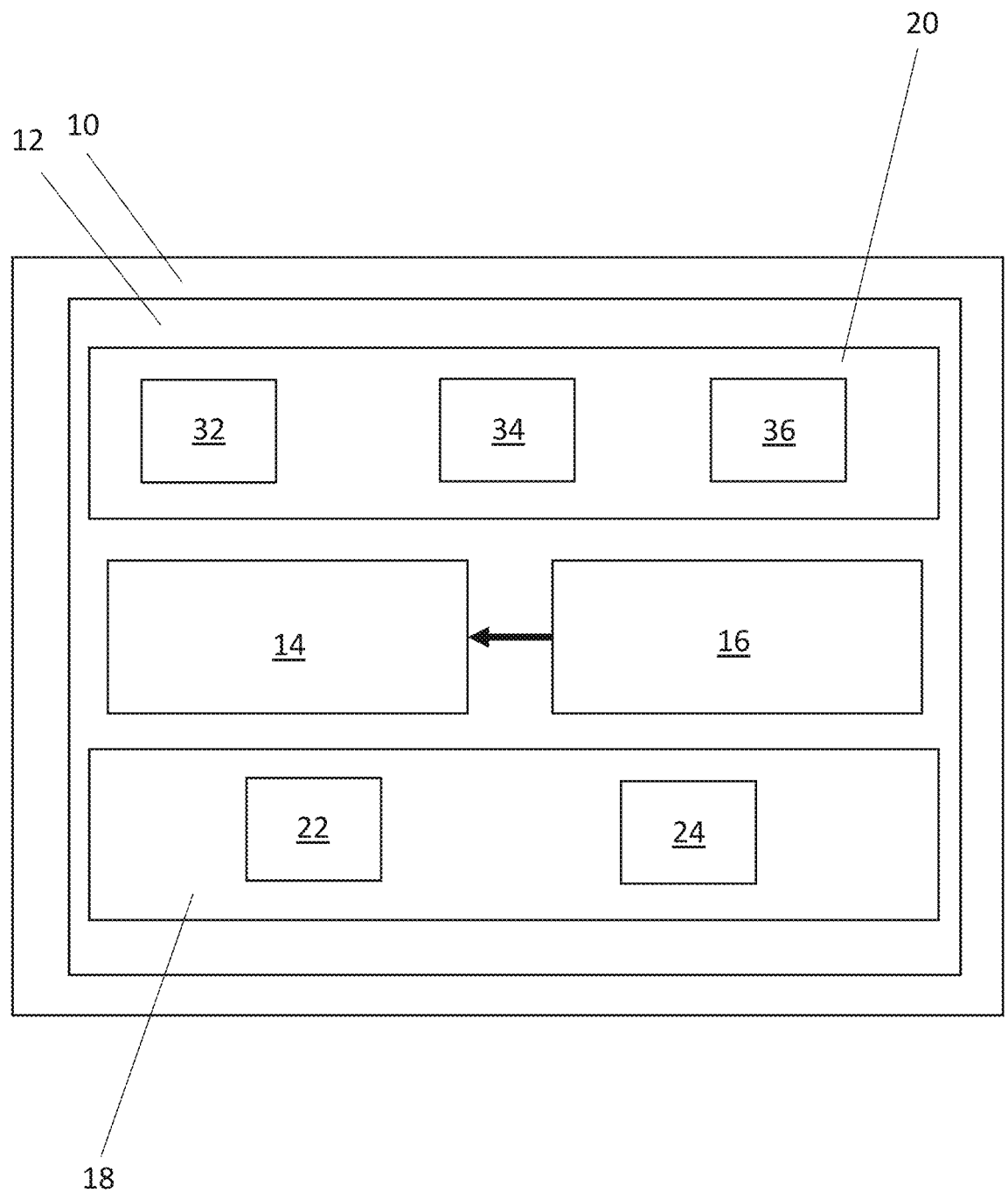
FIG. 1 shows a schematic of an aircraft comprising a propeller system.

FIG. 1 shows an aircraft 10. The aircraft 10 comprises a propeller system 12. The propeller system 12 comprises a propeller 14, a drive unit 16, a protection system 18 and a pitch control system 20.

The protection system 18 comprises a protection controller 22 and a propeller speed sensor 24.

The propeller speed sensor 24 may comprise a plurality of sensors configured to measure a propeller speed parameter. Where the propeller speed parameter comprises propeller speed, the propeller speed sensor 24 may be configured to measure propeller speed directly from the propeller 14. In other examples, where the propeller speed parameter comprises a drive unit parameter (from which propeller speed may be determined), the propeller speed sensor 24 may comprise sensor(s) to measure the drive unit parameters (e.g. drive unit speed, gear ratio and/or torque).

The pitch control system 20 (also referred to as a primary control system) comprises a propeller speed controller 32, a blade angle controller 34 and a propeller pitch sensor 36. The propeller pitch sensor 36 may also comprise a plurality of sensors (e.g. a second propeller speed sensor and a blade angle sensor) and may be configured to determine propeller speed and/or blade angle to determine propeller pitch.

Figure 2:
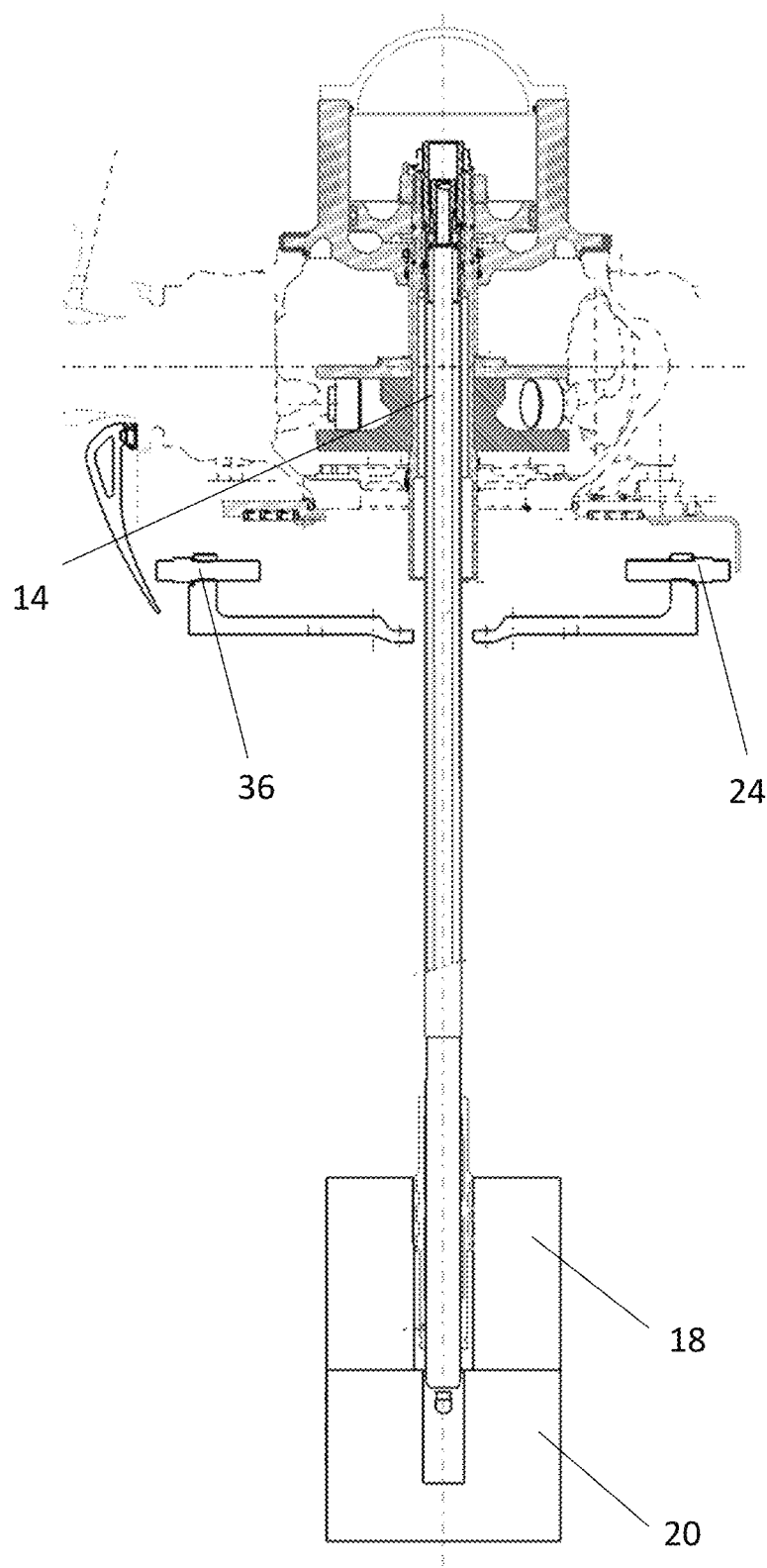
FIG. 2 shows a cross-sectional drawing of a propeller.

FIG. 2 shows the propeller 14 in more detail, highlighting the locations of the propeller speed sensor 24 and the propeller pitch sensor 36, which are located with the propeller 14, for example, contained in a propeller unit. The propeller speed sensor 24 and the propeller pitch sensor 36 are located remotely from the protection system 18 and the pitch control system 20.

In other examples, the blade angle sensor 36 may also be positioned remotely from the propeller 14, for example, with other components of the pitch control system 20.

In normal use, the drive unit 16 provides mechanical power to drive the propeller 14, which may be used for aircraft thrust or braking. The pitch of the propeller 14 is controlled by the pitch control system 20 in accordance with a pitch control process. In the pitch control process, the propeller pitch sensor 36 measures propeller pitch (e.g. blade angle and propeller speed).

The propeller speed controller 32 receives the propeller speed and controls the propeller speed to a target propeller speed (e.g. a planned propeller speed or a pre-planned propeller speed). The target propeller speed may vary throughout flight, for example with a higher target propeller speed during take-off than in cruise, and a lower target propeller speed during descent than in cruise.

The blade angle controller 34 receives the blade angle and controls the blade angle (e.g. by controlling a not shown blade angle motor through e.g. a mechanical, hydraulic or electro-mechanical system) to a target blade angle. Again, target blade angle may vary throughout flight. The target blade angle may be determined from a target propeller pitch and target propeller speed.

In this example, the pitch control system 20 implements proportional-integral-derivative control for both propeller speed and blade angle to achieve the target propeller speed and the target blade angle respectively. In other examples, the controller may implement non-linear control.

In some cases, a failure of the propeller control system 20 (or other component of the propeller system 12 or aircraft 10) may cause propeller overspeed, with propeller speed exceeding target propeller speed. As described below, in the event of overspeed, the protection system 18 performs an overspeed protection process.

Figure 3:
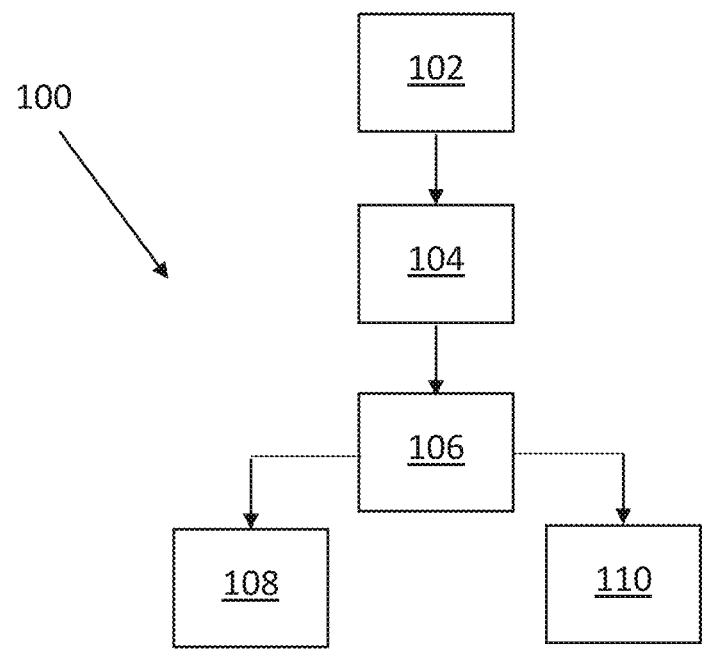
FIG. 3 shows a method of operating a propeller system.

FIG. 3 shows a method 100 of operating the propeller system 12. The method comprises a propeller speed measuring stage 102, a propeller speed threshold adjustment stage 104, a propeller speed comparison stage 106, a propeller speed control stage 108 and a protection stage 110.

In the propeller speed measuring stage 102, the propeller speed sensor 24 measures propeller speed parameters to determine propeller speed information. The propeller speed information indicates propeller speed (i.e. current rotational speed of the propeller 14). As described above, the propeller speed sensor 24 may measure propeller speed directly (where the propeller speed parameter comprises propeller speed) or may measure other parameter(s) from which propeller speed may be determined (e.g. the drive unit parameters mentioned above). The propeller speed information may therefore explicitly specify propeller speed or may include information from which propeller speed may be determined.

In the propeller speed threshold adjustment stage 104, the protection controller 102 receives the propeller speed information from the propeller speed sensor 24. The protection controller 102 determines the propeller speed from the propeller speed information.

The protection controller 102 receives the target propeller speed (e.g. from the propeller speed controller 32 or other component of the pitch control system 20). The target propeller speed is the current speed to which the propeller speed controller 32 aims to control the propeller 14.

The protection controller 102 performs a propeller speed threshold adjustment process. In the propeller speed threshold adjustment process, the protection controller 102 adjusts (i.e. determines) a propeller speed threshold as a function of the target propeller speed. The protection controller 102 reduces the propeller speed threshold in response to reducing target propeller speed. The protection controller 102 adjusts the propeller speed threshold in proportion to the target propeller speed. The protection controller 102 adjusts the propeller speed threshold to a constant value multiplied by the target propeller speed. The protection controller 102 adjusts the propeller speed threshold according to the equation below.

$$\text{propeller speed threshold} = \alpha \cdot (\text{target propeller speed})$$

where, $1.0 < \alpha < 1.1$.

In the propeller speed comparison stage 106, the protection controller 102 compares the propeller speed to the propeller speed threshold.

In the event that the propeller speed does not exceed the propeller speed threshold, the propeller control system 20 controls the propeller speed in the propeller speed control stage 108, according to the pitch control process as in normal use as described above.

In the event that the propeller speed exceeds the propeller speed threshold, the protection controller 102 performs the overspeed protection process. In the overspeed protection process, the protection controller 102 controls the propeller system to reduce propeller speed. The protection controller 102 maintains blade angle at a target blade angle of the propeller e.g. according to a planned blade angle or a pilot-controlled blade angle. The protection controller 102 does not control blade angle. The protection controller 102 bypasses the propeller speed controller 32.

After the protection process, if the failure resulting in the overspeed event is rectified or removed, the propeller speed may be controlled by the propeller control system 20 as in the normal use in the propeller speed control stage 108.

While method steps and/or features have been described with respect to a specific processor, control or sensor, the steps or features may be performed by the same component or across multiple components. Additionally, some processors may be located remotely from the aircraft, and may communicate with components of the aircraft.

Various aspects of the apparatus disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method of operating a propeller system for an aircraft, the propeller system comprising a propeller, the method comprising:
   receiving propeller speed information, the propeller speed information indicating propeller speed;
   receiving a target propeller speed;
   performing a propeller speed threshold adjustment process, the propeller speed threshold adjustment process comprising adjusting a propeller speed threshold as a function of the target propeller speed;
   comparing the propeller speed to the propeller speed threshold; and
   in response to the propeller speed exceeding the propeller speed threshold, performing an overspeed protection process.

2. The method according to claim 1, further comprising: measuring a propeller speed parameter to provide the propeller speed information.

3. The method according to claim 2, wherein the propeller speed parameter comprises propeller speed.

4. The method according to claim 3, wherein the propeller speed parameter comprises a drive unit parameter measured from a drive unit of the aircraft, the drive unit configured to drive the propeller.

5. The method according to claim 1, wherein the overspeed protection process comprises controlling the propeller system to reduce the propeller speed.

6. The method according to claim 1, wherein the overspeed protection process comprises substantially maintaining blade angle at a target blade angle of the propeller.

7. The method according to claim 1, wherein controlling the propeller system to reduce the propeller speed comprises controlling the propeller system to reduce a propeller torque.

8. The method according to claim 1, wherein the overspeed protection process includes bypassing a propeller speed controller of the propeller system.

9. The method according to claim 1, wherein the propeller speed threshold adjustment process comprises reducing the propeller speed threshold in response to reducing the target propeller speed.

10. The method according to claim 9, wherein the propeller speed threshold adjustment process comprises adjusting the propeller speed threshold in proportion to the target propeller speed.

11. The method according to claim 10, wherein the propeller speed threshold adjustment process comprises adjusting the propeller speed threshold to a constant value multiplied by the target propeller speed, wherein the constant value is between 1 and 1.1.

12. A protection system for a propeller system, the propeller system comprising a propeller, the protection system comprising:
    a protection controller configured to:
    receive propeller speed information, the propeller speed information indicating propeller speed;
    receive a target propeller speed;
    perform a propeller speed threshold adjustment process, the propeller speed threshold adjustment process comprising adjusting a propeller speed threshold as a function of the target propeller speed;
    compare the propeller speed to the propeller speed threshold; and
    in response to the propeller speed exceeding the propeller speed threshold, perform an overspeed protection process.

13. A propeller system comprising:
    the protection system according to claim 12; and
    the propeller.

14. The propeller system according to claim 13, further comprising:
    a propeller speed controller, the propeller speed controller configured to control the propeller speed to the target propeller speed in the event that the propeller speed does not exceed the propeller speed threshold.

15. An aircraft comprising the propeller system according to claim 14.

* * * * *